June 3, 1924. 1,496,301
G. W. CUNNINGHAM
VENTILATOR
Filed Oct. 7, 1922
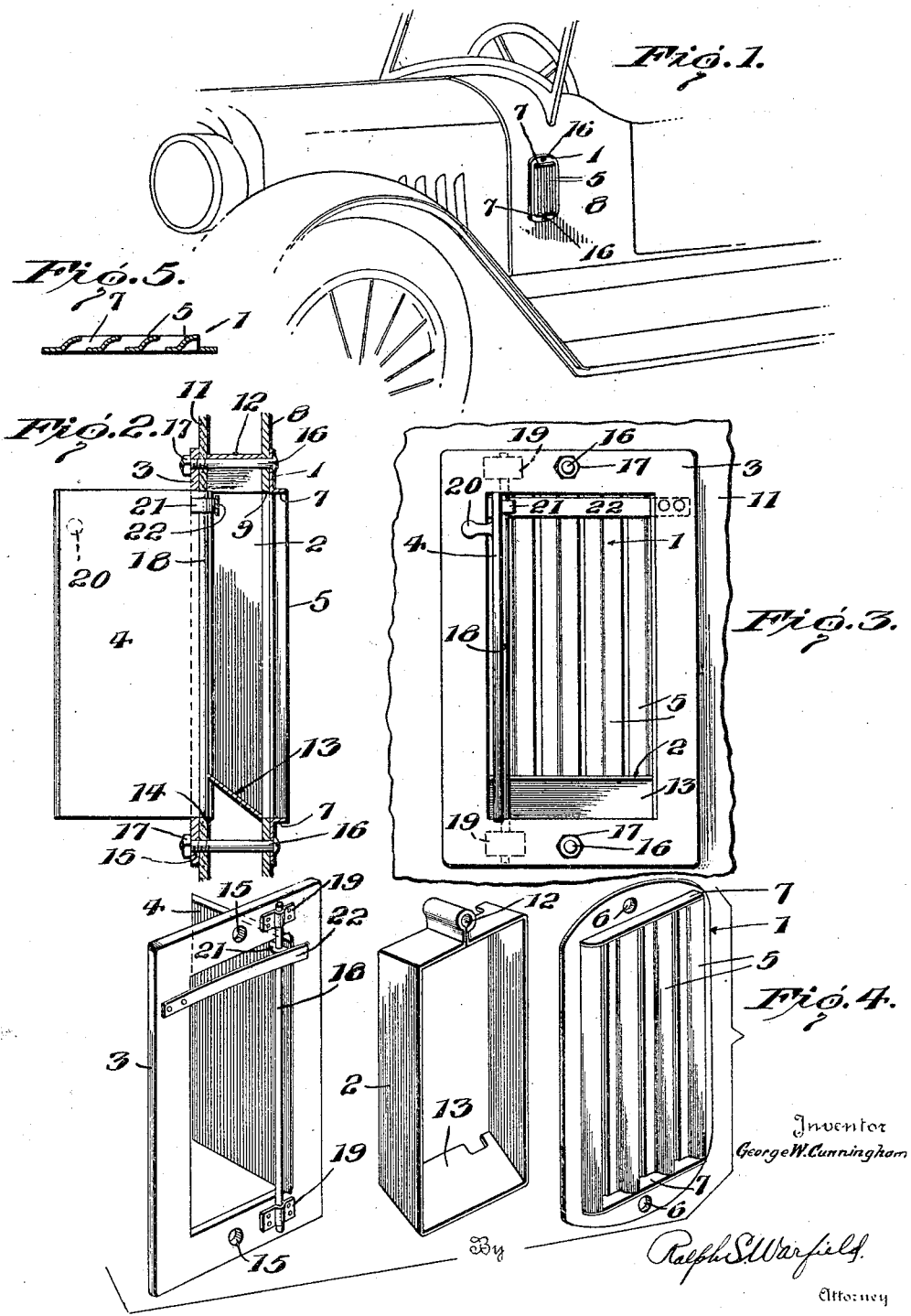
Inventor
George W. Cunningham
By Ralph S. Warfield
Attorney Patented June 3, 1924.

1,496,301

UNITED STATES PATENT OFFICE.

GEORGE W. CUNNINGHAM, OF WILKES-BARRE, PENNSYLVANIA.

VENTILATOR.

Application filed October 7, 1922. Serial No. 592,953.

*To all whom it may concern:*

Be it known that I, GEORGE W. CUNNINGHAM, a citizen of the United States, residing in the city of Wilkes-Barre, Luzerne County, Pennsylvania, have invented new and useful Improvements in Ventilators, of which the following is a specification.

More particularly, this invention relates to ventilators for automobiles and the like, one object being to provide a ventilator which may be readily attached to automobiles or motor vehicles already in use, as well as adapted to be built in to such vehicles while in process of construction.

Another object is the provision of a ventilator for motor vehicles which can be kept open while the vehicle is traveling during rain or snow storms without liability of short circuiting the electrical equipment or otherwise damaging it due to admission of water. The current of air induced by the passage of the motor vehicle, flows through ventilators preferably located on opposite sides of the cowl, into the space beneath the instrument board and behind the dash, and carries off the odors from the motor, which percolate through the cracks around the dash and annoy persons occupying the front seat.

Many forms of scoop or hooded ventilators now in common use are located on top and centrally of the cowl in front of the windshield and above the electric wiring, rendering the latter liable to derangement through moisture during a storm, if the ventilator is left open.

Still another object of my invention is the provision of a ventilator adapted for attachment to various makes of motor vehicles in some of which the cowls have no lining or finishing material, and in others of which, the lining is placed at varying distances from the inside surfaces of the cowls.

A further object is the provision of an automobile ventilator readily attachable to motor vehicles now in use, with but little expenditure of labor; simple and neat in construction, unobstrusive in appearance, and so located as to be out of the way and in no danger of accidental blows, yet easily and quickly opened and closed.

A still further object is the provision in a ventilator of this nature, of a simple means to hold the ventilator closure at any desired position within its range of adjustment and one which is not likely to get out of order.

Another object is the provision of a knockdown ventilator, composed of separable parts, removably secured together by a minimum number of fastening means common to the several elements or parts.

Additional objects are the provision of a ventilator so constructed that it almost automatically locates itself in vertical position on the motor vehicle when being applied thereto, and one wherein any water which by accident finds its way into the ventilator is immediately led back to the outside of the vehicle.

To these and other ends my invention comprises certain novel features and combinations, which will be more fully explained hereinafter and particularly pointed out in the claims.

In the accompanying drawings, Fig. 1 is a perspective view, looking from the front, showing one embodiment of my invention applied to the side of the cowl of a motor vehicle.

Fig. 2 is a vertical longitudinal sectional view through a portion of the cowl of a motor vehicle having my invention applied thereto;

Fig. 3 is a rear view, showing the ventilator fully open;

Fig. 4 is a disassembled perspective of the three elements comprising the invention, and Fig. 5 is a transverse cross sectional view through the louver plate of the ventilator.

The embodiment of my invention selected for illustration comprises three elements, the louver plate 1, the filler or spacing frame 2, and the casing 3 in which may be mounted a door 4.

The louver plate 1 may be of any suitable shape, though preferably oblong, having the louver slats 5, preferably stamped outwardly therefrom, the slats being substantially Z-shaped in cross-section. The ends of the plate extend beyond the ends of the slats, and are apertured, as at 6, to accommodate means whereby the plate is secured in place.

In the particular form of louver plate shown, flanges 7 extend across, and are secured to the ends of the respective louver slats to strengthen the latter against accidental bending, the flanges also serving to reinforce and impart rigidity to the slats and louver plate, as well as to give the latter a finished appearance. An inspection of Fig. 5 will show that the outer edges of the louver slats 5 and flanges 7 lie in a plane substantially parallel with the wall of the vehicle.

The louver plate is composed preferably of some non-rusting material, as copper.

The ventilators are preferably applied to the opposite sides of the cowl of the machine, at points behind the dash board and above the floor boards, although they may be located at any convenient and desired place on the machine.

In equipping a machine with these ventilators, one method that may be followed is to first select the point at which the ventilator is to be located, after which the louver plate 1 may be placed against the side 8 of the vehicle at the desired spot, and a sharp pointed instrument used to mark the side of the cowl at the point where the upper aperture 6 lies. The louver plate 1 may then be removed and a hole drilled through the side 8 of the cowl at the point marked. Then by thrusting a nail, bolt or other pilot member through the upper aperture 6 in the louver plate 1, and through the hole drilled in the side of the vehicle, gravity will cause the louver plate to depend vertically from the pilot, and thus properly locate itself relatively to the side of the vehicle. The place for the lower hole in the side of the vehicle may then be properly located, as well as the height and width of the ventilating opening 9 to be cut through the side of the cowl to admit air, a sharp pointed instrument being inserted through the louver openings at the opposite sides, top and bottom of the slatted portion of the louver plate, to suitably mark the cowl to define the size of the ventilating opening.

The louver plate may then be removed from the side of the vehicle, the lower hole drilled, and the material cut out to form the ventilating opening 9 in the side of the cowl. If the foregoing or a similar method is pursued, the ventilating opening will be slightly less in width and height than the size of the louver plate 1, so that the side and end margins of the plate may rest against the side of the vehicle surrounding the opening.

Most, if not all, of the moderate and higher priced motor vehicles are lined or sheathed on the inner sides of the cowl with a lining 11 of stiff leather, fiber or other material to conceal the unfinished inner surface of the metal from which the cowl is formed, no attempt being made to cause the lining to conform to the shape of the cowl, and consequently, the lining generally stands apart from the inner surface of the cowl.

When drilling the holes through the cowl 8 in registry with the apertures 6 of the louver plate, the drill may also be of sufficient length to penetrate the sheathing or lining 11.

In order to take up or compensate for the space between the inner surface of the cowl 8 and the sheathing or lining 11, I provide, in instances where such lining is used, the filler or spacing frame 2, which is a hollow frame, preferably rectangular in outline, and open front and back. This frame 2 has a loop or eye 12 formed on its upper wall adapted to lie in registry with the upper aperture 6 of the louver plate 1, and the first hole drilled in the cowl 8, the lower bar of the filler frame being inclined outwardly, as indicated at 13.

The spacing frame 2 may be made of different widths to accommodate itself to different widths of space between the lining 11 and the inner surface of the cowl, though this is not essential, as the lining is usually sufficiently flexible to yield in or out so as to lie against the inner edge of the frame.

The outer edge of the frame 2 fits around the ventilating opening 9 cut in the cowl, with the lower inclined edge of the frame lying just about level with the lower edge of the opening 9 which in turn is about level with the lower ends of the slots between the louver slats so that any water which may by chance find entrance between the slats, will be caught by the frame 2 and drained out along the inclined lower bar 13 of the frame, and back through the slots in the louver plate 1 to the outside of the vehicle.

In cases where no lining is present, the filler frame may be omitted, if desired.

An opening 14 in the lining 11, may be cut or formed at the same time that the ventilating opening 9 is cut or formed in the cowl, and is preferably in registry therewith.

In order to control the ventilation, and also to impart a finished appearance to the inside of the vehicle, as well as to provide means whereby to secure the filler frame 2 in place, I provide a casing 3, rectangular in shape and preferably equipped with a door 4, the opening in the casing being conveniently of a size substantially equal to the size of the slatted portion of the louver plate 1, though this is not necessary.

The casing 3 is adapted for application to the exposed face of the lining 11, and surrounds the opening 14 formed therein. Apertures 15 at the upper and lower ends of the casing register with the holes drilled in the lining 11 and in the cowl 8, the upper aperture 15 also registering with the loop or eye 12 on the upper wall or bar of the filler or spacing frame 2, and bolts 16 or other fastening means pass through the apertures 6 in the louver plate, the holes in the cowl, the eye 12, the holes in the lining, and the apertures 15 in the casing. Nuts 17 on the inner ends of the bolts securely clamp the parts together and hold them in place against rattling or other disturbing noise, the lining 11 interposed between the casing 3 and filler frame 2 also operating to deaden any noise.

It will be observed that the lower inclined bar 13 of the filler frame has no eye for the corresponding bolt, but one might be supplied without departing from the spirit of this invention.

However, it is not considered an essential requirement, as the clamping action of the bolts and nuts 16 and 17 will hold the parts firmly and snugly together.

Attention is called to the fact that but two fastening means 16, 17, are necessary to secure the ventilator to the vehicle, and that such fastening means are common to the several elements composing the ventilator.

The door 4 snugly fits the opening in the casing 3 and may be secured to the casing in any convenient fashion, as by fastening a pintle 18 to the inner face of the door near one longitudinal edge thereof, the opposite ends of the pintle projecting above and below the top and bottom edges of the door. Straps 19 rotatably secure the projecting ends of the pintle 18 to the casing, and permit the opening and closing of the door.

In order to make a tight joint, the hinged edge of the door may be slightly beveled to prevent binding against the adjacent edge of the casing 3 when the door is opened and closed as shown in Figure 4.

A knob 20 located near the upper end of the door where it is most accessible, enables the operator to open and close the door.

As one means for retaining the door either closed, or in any open position to which it may be adjusted, I provide the pintle 18 with an arcuate braking member 21 turning with the pintle which is fast with the door, a leaf spring 22 being fastened at one end to the inside face of the casing with its free end bearing against the brake member 21. The frictional contact of the spring 22 with the brake member 21 is sufficient to hold the door in any of its positions, and yet permit it to be readily opened or closed without the necessity of releasing a latch.

It will be obvious that a ventilator constructed in accordance with my invention can be shipped knocked down with instructions as to applying it. In some instances, the door 4 with the means for holding it closed or open, may be omitted if the user wishes a permanent ventilation without regard to frigid temperatures or wet weather, and in instances where the filler frame is omitted and the door retained, space within which the projecting spring or retaining member 22, and the brake member 21 may operate, will be afforded by the thickness of the cowl 8, as the spring and brake will then lie within the ventilating opening 9 instead of within the opening 14 in the lining 11.

Other changes and alterations may be made in the form and arrangement of the several parts described, without departing from the spirit and scope of my invention.

What I claim as new, is:—

1. A knock-down ventilator for vehicles comprising a louver plate applied to the exterior of a vehicle over a ventilating opening formed in a wall thereof; a hollow frame located inside the vehicle, and surrounding the opening in the wall thereof, the frame having an eye; a casing located in juxtaposition to the hollow frame, and communicating therewith; and fastening means passing through the louver plate, the wall of the vehicle, the eye of the hollow frame and the casing, to clamp the casing, frame and louver plate to the wall of the vehicle.

2. The combination with a vehicle having a ventilating opening formed in a wall thereof; of a louver plate located exteriorly of the wall and over the opening; a casing located interiorly of the wall and in registry with the opening; and separate fastening means common to the louver plate and casing and passing through the upper and lower ends thereof, respectively, to hold the parts together and connect them to the wall, the upper fastening means operating to locate the louver plate in vertical position when applying the latter to the vehicle.

3. The combination with a vehicle having a ventilating opening formed in a wall thereof; of a louver plate located exteriorly of the wall and over the opening; a door casing located interiorly of the wall and in registry with the opening; a door having a pintle pivoted to the casing to close or open the opening therein; and means to retain the door in any of its positions, comprising a brake member mounted on the pintle, and a spring mounted on the casing and adapted to bear against the member.

4. The combination with a vehicle having a ventilating opening formed in a wall thereof; of a louver plate located exteriorly of the wall and over the opening; a door casing located interiorly of the wall and in registry with the opening; a door mounted to swing in the casing to close or open the opening therein; and means to retain the door in any of its positions, comprising a brake member connected with, and arranged coaxially with the pivot of the door, and a spring bearing against the member.

5. The combination with a vehicle having a ventilating opening formed in a wall thereof; of a louver plate located exteriorly of the wall and over the opening; a casing located on the inner surface of the wall and in registry with the opening; a door having a pintle adapted to project above the top and below the bottom edges of the door; straps on the casing to rotatably secure the pintle to the casing; and means to retain the door in any of its adjusted positions.

6. In a knock-down ventilator for vehicles, the combination of a louver plate mounted against the outer wall of the vehicle over an opening therein, and projecting outwardly therefrom; an apertured casing located within the vehicle, and in communication with the opening in the wall thereof; a hollow frame interposed between the plate and casing, and having its lower bar inclined upwardly from the lower edges of the louver openings to discharge water; and fastening means passing through the wall to clamp the louver plate, casing and frame firmly together.

7. In a ventilator, the combination of a louver plate; a casing; a hollow frame interposed between the plate and casing, and having an eye; and fastening means common to the louver plate, frame and casing, to secure the parts together, the fastening means passing through the plate and casing, and through the eye on the hollow frame.

8. In a ventilator, the combination of a louver plate; a casing; and a hollow frame interposed between the plate and casing; an eye member secured to the upper bar of the frame, the lower bar of the frame being inclined, with its lower edge substantially level with the lower ends of the slots in the louver plate; and fastening means passing through the eye and through the plate and casing.

9. The combination with a vehicle having a ventilating opening formed in one wall thereof, and a lining spaced apart from the interior face of the wall; of a louver plate located over the opening; a filler frame surrounding the opening within the vehicle, between the wall of the vehicle and the lining; the lower bar of the filler frame being inclined, and having its lower edge substantially level with the bottom edge of the ventilating opening; the lining having an opening therein to communicate with the filler frame; a casing located on the exposed side of the lining; and fastening means passing through the louver plate and casing to clamp the parts together and hold them in place.

10. The combination with a vehicle having a ventilating opening formed in one wall thereof, and a lining spaced apart from the interior face of the wall; of a louver plate located over the opening; a filler frame surrounding the opening within the vehicle, between the wall of the vehicle and the lining; the lower bar of the filler frame being inclined, and having its lower edge substantially level with the bottom edge of the ventilating opening; the lining having an opening therein to communicate with the filler frame; a casing located on the exposed side of the lining; and a door in the casing.

GEORGE W. CUNNINGHAM.